United States Patent
Wang et al.

(10) Patent No.: US 10,007,478 B2
(45) Date of Patent: Jun. 26, 2018

(54) SYSTEM AND METHODS FOR VOICE-CONTROLLED SEAT ADJUSTMENT

(71) Applicant: Ford Global Technologies, LLC, Dearborn, MI (US)

(72) Inventors: Tony Wang, Nanjing (CN); Frank Wu, Novi, MI (US); Rose Tong, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 14/751,310

(22) Filed: Jun. 26, 2015

(65) Prior Publication Data

US 2016/0379631 A1 Dec. 29, 2016

(51) Int. Cl.
*G10L 15/00* (2013.01)
*G06F 3/16* (2006.01)
*B60N 2/02* (2006.01)
*G10L 15/22* (2006.01)

(52) U.S. Cl.
CPC ............. *G06F 3/16* (2013.01); *B60N 2/0228* (2013.01); *B60N 2/0232* (2013.01); *G10L 2015/223* (2013.01)

(58) Field of Classification Search
CPC ......... G10L 15/22; G10L 15/20; G10L 15/00; G10L 15/02; G10L 2015/221; G10L 2015/223; G10L 2015/225; G10L 2015/226
USPC ..................... 704/275, 230–231, 246–255, 9
See application file for complete search history.

(56) References Cited

U.S. PATENT DOCUMENTS

| | | | |
|---|---|---|---|
| 4,797,924 A | 1/1989 | Schnars et al. | |
| 5,319,248 A | 6/1994 | Endou | |
| 6,240,347 B1 | 5/2001 | Everhart et al. | |
| 2003/0169522 A1* | 9/2003 | Schofield | B60R 1/04 359/876 |
| 2004/0143440 A1 | 7/2004 | Prasad et al. | |
| 2006/0155547 A1 | 7/2006 | Browne et al. | |
| 2007/0090967 A1* | 4/2007 | Zuccotti | G08C 17/02 340/4.61 |
| 2010/0318266 A1* | 12/2010 | Schaaf | B60K 35/00 701/49 |

* cited by examiner

*Primary Examiner* — Vincent Rudolph
*Assistant Examiner* — Stephen Brinich
(74) *Attorney, Agent, or Firm* — Vichit Chea Price Heneveld LLP

(57) ABSTRACT

A control system for a vehicle having a seat with a first moveable portion and an adjustment actuator coupled with the first moveable seat portion includes a voice input device, a touchscreen input device, and a controller in communication with the adjustment actuator, the voice input device, and the touchscreen input device. The controller has a processor programmed to interpret a first adjustment command from one of a voice command received from the voice input device and a manual command received from the touchscreen input device, carry out a first seat adjustment by causing the adjustment actuator to move the first moveable seat portion according to the first adjustment command, and to present information related to the first adjustment command on the touchscreen.

18 Claims, 5 Drawing Sheets

SYSTEM AND METHODS FOR VOICE-CONTROLLED SEAT ADJUSTMENT

FIELD OF THE DISCLOSURE

The present disclosure generally relates to a system for control of power-adjustable vehicle seats. The system is capable of interpreting voice commands as well as touch-based interactions, alone or in combination, to implement adjustments of one or more seats.

BACKGROUND OF THE DISCLOSURE

Power-adjustable motor vehicle seats allow a seat occupant or user to adjust various moveable portions of a vehicle seat using designated buttons or switches. Such buttons or switches are often associated with predetermined movements of associated moveable portions of the seat in various directions and may be shaped and configured to mimic the relative positioning, size, and/or shape of the actual moveable or adjustable portions of the seat. For example, an array of power seat adjustment buttons may be placed along the base of the vehicle seat and may include one switch controlling movement of the seat cushion and another switch controlling movement of the seatback. These buttons may be positioned in locations corresponding to the relative locations of the cushion and seatback and may be moveable in the directions of adjustment thereof (fore and aft for the cushion mimicking seat slide control and tilting for the seatback mimicking seatback incline, for example).

Such conventional power seat controls may be acceptable and appropriately intuitive for user operation in connection with seats with few adjustment options. However, adjustable vehicle seats are being developed and offered with increasing numbers of moveable portions with increasingly complex or nuanced movements. Accordingly, it can be difficult to incorporate buttons or switches into a physical control array in an intuitive manner (particularly when located in an area of the vehicle that is not visible to the occupant). Further, such physical arrays have failed to develop along conventionally accepted schemes, meaning that different vehicles offer different controls that require great familiarity, and even study, to understand. Still further, such switch-based controls do not provide any feedback or notification when an adjustment has reached a physical limit and further do not offer any limitations for adjustment based on occupant safety.

Accordingly, improvements to control systems for power-adjustable vehicle seats are desired to reduce reliance on complex physical buttons, to provide visual feedback for adjustment commands, to provide the capability to limit adjustments based on occupant safety, and to offer hands-free adjustment modes.

SUMMARY OF THE DISCLOSURE

According to one aspect of the present disclosure, a control system for a vehicle having a seat with a first moveable portion and an adjustment actuator coupled with the first moveable seat portion includes a voice input device, a touchscreen input device, and a controller in communication with the adjustment actuator, the voice input device, and the touchscreen input device. The controller has a processor programmed to interpret a first adjustment command from one of a voice command received from the voice input device and a manual command received from the touchscreen input device, carry out a first seat adjustment by causing the adjustment actuator to move the first moveable seat portion according to the first adjustment command, and to present information related to the first adjustment command on the touchscreen.

According to another aspect of the present disclosure, a control system for an adjustable vehicle seat includes a microphone, a touchscreen, and a controller in communication with the seat, the microphone, and the touchscreen. The controller is programmed to begin a first adjustment of the seat upon interpreting a first adjustment command based on input received from one of the microphone and the touchscreen and to stop the first adjustment upon interpreting a stop command received from one of the microphone and the touchscreen.

According to another aspect of the present disclosure, a method for adjusting a vehicle seat having a plurality of moveable portions and an adjustment actuator coupled to a first one of the portions includes receiving an adjustment initiation command from one of a voice input device and a physical input device. The method also includes entering a seat adjustment mode in response to the adjustment initiation command and receiving a first adjustment command from one of the voice input device and the physical input device, and when in the seat adjustment mode, causing the actuator to move the first moveable seat portion according to the first adjustment command.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
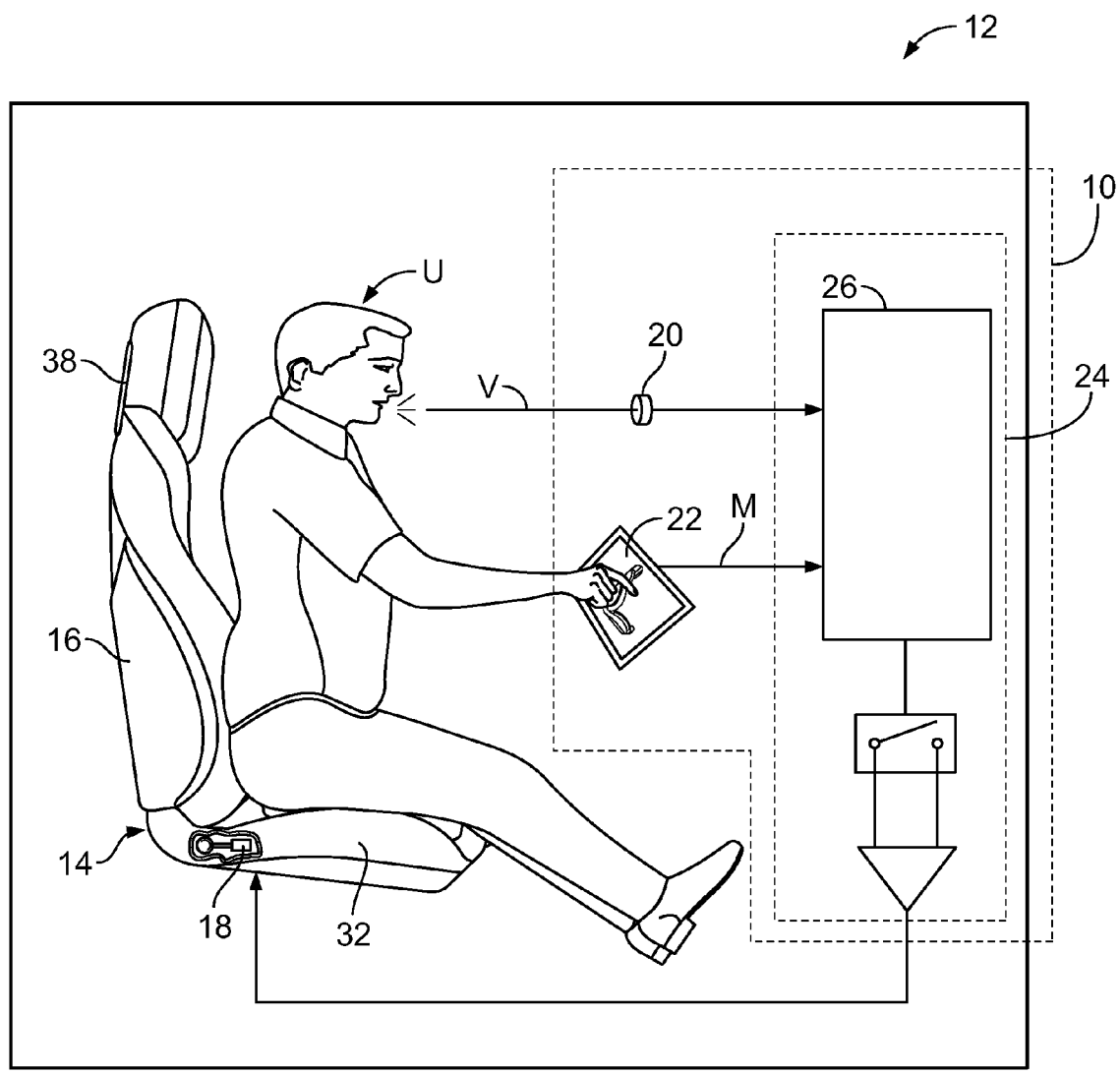
FIG. 1 is a schematic illustration of a vehicle including a seat and a control system for adjusting the seat according to one embodiment.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring now to FIG. 1, reference numeral 10 generally designates a control system according to an embodiment of the present disclosure. As depicted, control system 10 is for a vehicle 12 (depicted schematically in FIG. 1) having a seat 14 with a first moveable portion, shown by way of example as seatback 16 (other examples of movable seat portions being discussed herein), and an adjustment actuator 18 coupled with the first moveable portion. Such coupling can be accomplished by various gears, lever arms, pulleys, chains, combinations thereof, and the like. System 10 includes a voice input device 20, which can be, for example, a microphone or other device capable of converting sound waves into an electronic signal. Further, system 10 includes a physical input device, as shown in the form of a touchscreen 22, and a controller 24 in communication with the adjustment actuator 18, the voice input device 20, and the touchscreen 22. The controller 24 includes a processor 26 programmed to interpret a first adjustment command from either a voice command V received from the microphone 20 or a manual command M received from the touchscreen 22 and to carry out a first seat adjustment by causing the adjustment actuator 18 to move the first moveable seat portion according to the first adjustment command. The processor 26 is further programmed to present information related to the first adjustment command on the touchscreen 22.

Figure 2:
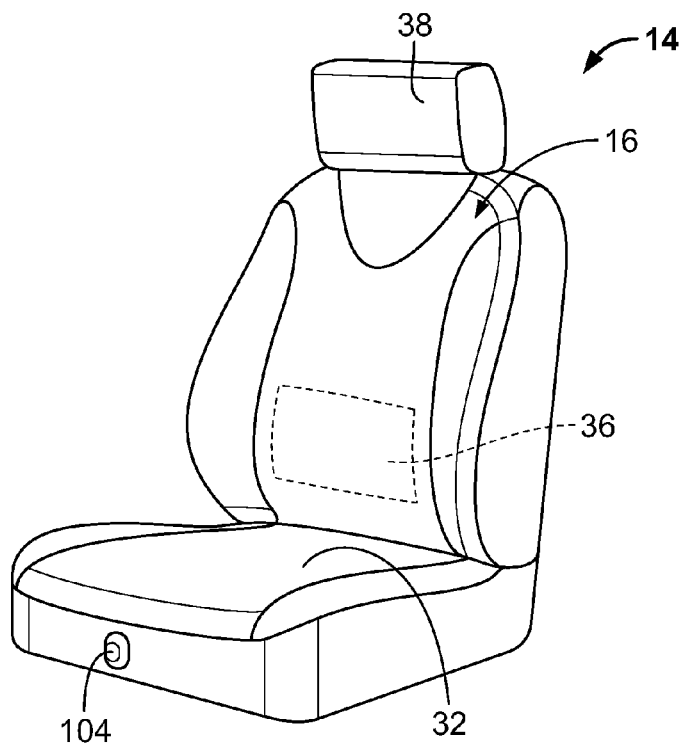
FIG. 2 is a depiction of a vehicle seat that can be used with the control system of FIG. 1.
Figure 3:
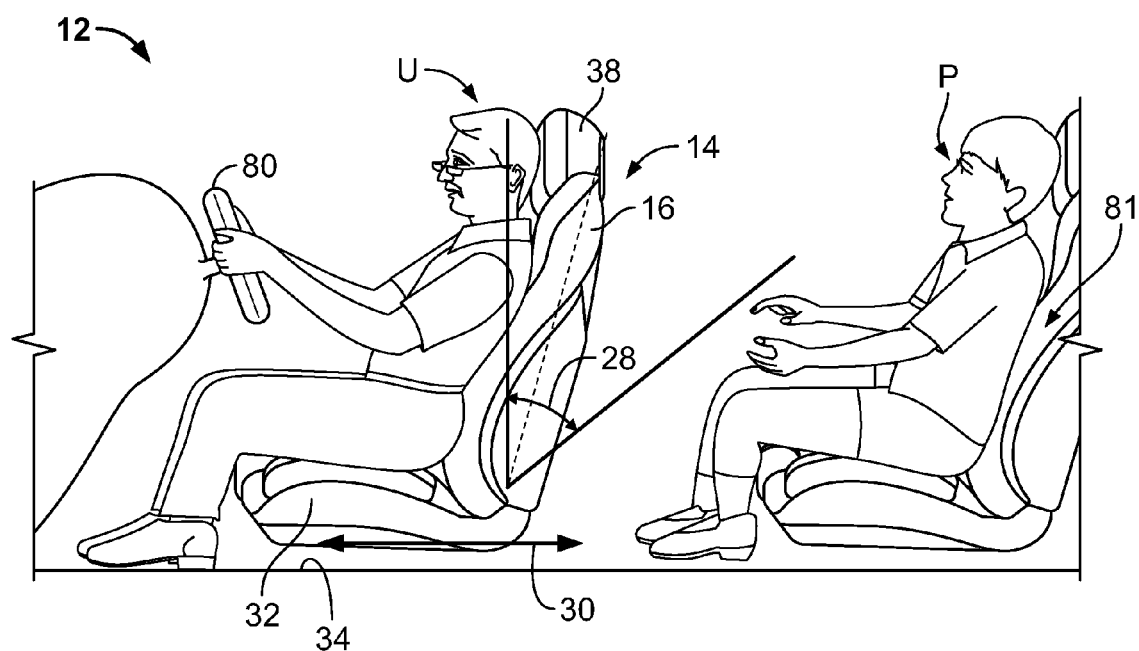
FIG. 3 is an illustration of a portion of a vehicle including a seat that can be used with the control system of FIG. 1.

As can be seen in FIGS. 2 and 3, an example of a vehicle seat 14 can include a number of different portions that can be made moveable with respect to each other to provide various forms of user adjustment for seat 14. Further, such moveable portions can be "power adjustable" by including an actuator 18, or a plurality of actuators in and actuator system, within seat 14 that are electronically operable to move one or more of the moveable seat portions with which they may be coupled. As used herein, the term "actuator" is to be understood as referring to either a single actuator device (such as an electronic motor or the like, for example) that can be coupled to one or more moveable seat portions or a network or system of multiple actuators respectively coupled to one or more moveable seat portions of the same seat 14. Seat 14 is depicted as a single-occupant seat or a "captain" seat, but other types of seats, such as bench seats or the like, which are configured for multiple occupants, can be made adjustable by structures and mechanisms similar to those discussed herein, and can be controlled by system 10 in a manner similar to that which is discussed herein with respect to seat 14. As mentioned above, seatback 16 can be one of the moveable portions of seat 14 so as to be adjustable by rotation thereof through a predetermined range of positions within incline angle 28, as depicted in FIG. 3.

Various types of actuators can be used for actuator 18 (depicted schematically in FIG. 1) to control movement of seatback 16 and to maintain a selected position thereof, including one or more electric motors coupled with an appropriate configuration of reduction gearing, as needed, along with any clutch or brake mechanisms that may be needed or desired. Alternatively, various types of linear drive actuators can be used (including, a power-screw based actuator), which may themselves include an electric motor or the like, as well as certain types of hydraulic or pneumatic actuators, with appropriate fluid reservoirs and pressure sources and delivery lines being considered a part of the actuator for purposes of this disclosure. Any type of device used for actuator 18 can be electrically coupled with controller 24 for controlled adjustment of seatback 16 (and/or other moveable seat portions) by system 10.

As further shown in FIG. 3, seat 14 can be mounted within vehicle 12 such that seat 14 is slidable in a fore-aft direction 30 such as by mounting seat 14 on tracks (not shown) that can be coupled with the frame of vehicle 12, directly or through crossmembers coupled with the frame. Such slidable motion of seat 14 can provide for adjustment of the position of seat 14 in the fore-aft direction 30, which can be achieved by an additional actuator appropriately coupled with seat 14, such as with a portion of cushion 32 as well as operative coupling with the tracks or with the portion of vehicle 12 beneath seat 14. Such an actuator can be any of the types described above. In another example, actuator 18 can also be configured to provide for sliding of seat 14 in addition to rotation of seatback 16 by appropriate mechanisms.

Additional modes of adjustment for seat 14 can be implemented by similar, appropriate structures therein. For example, seat 14 can be structured for power adjustment of cushion 32 in by tilting thereof along the fore-aft direction 30 or in the height of cushion 32 with respect to the adjacent floor 34 of vehicle 12. Such adjustment can further raise and lower seat 14 as a whole or can move cushion 32 independently of other portions of seat 14. In another example, seat 14 may provide for adjustment of the shape of and support provided by lumbar area 36 of seatback 16. Such adjustment can be accomplished by a number of independent actuators that act against the interior of the related surface of seatback 16 or by an internal insert (not shown) within seatback 16 that can be moved in multiple directions (fore-aft and vertical, for example) by one or more actuators. In another example, such an insert can be inflatable by a pneumatic actuator, for example. Still further, headrest 38 can be moveable by actuator 18 or by additional actuators in a vertical direction (i.e. up and down with respect to floor 34) and/or in a tilting motion along generally the same direction as the incline 28 of seatback 16. Any additional actuators present in seat 14 or associated therewith can be electrically coupled with controller 24 for controlled adjustment of the associated moveable portions of seat 14 by system 10, as described herein. Still further modes of seat adjustment can be implemented by system 10 by actuator 18 or additional, appropriately-configured actuators coupled with controller 24.

Figure 4:
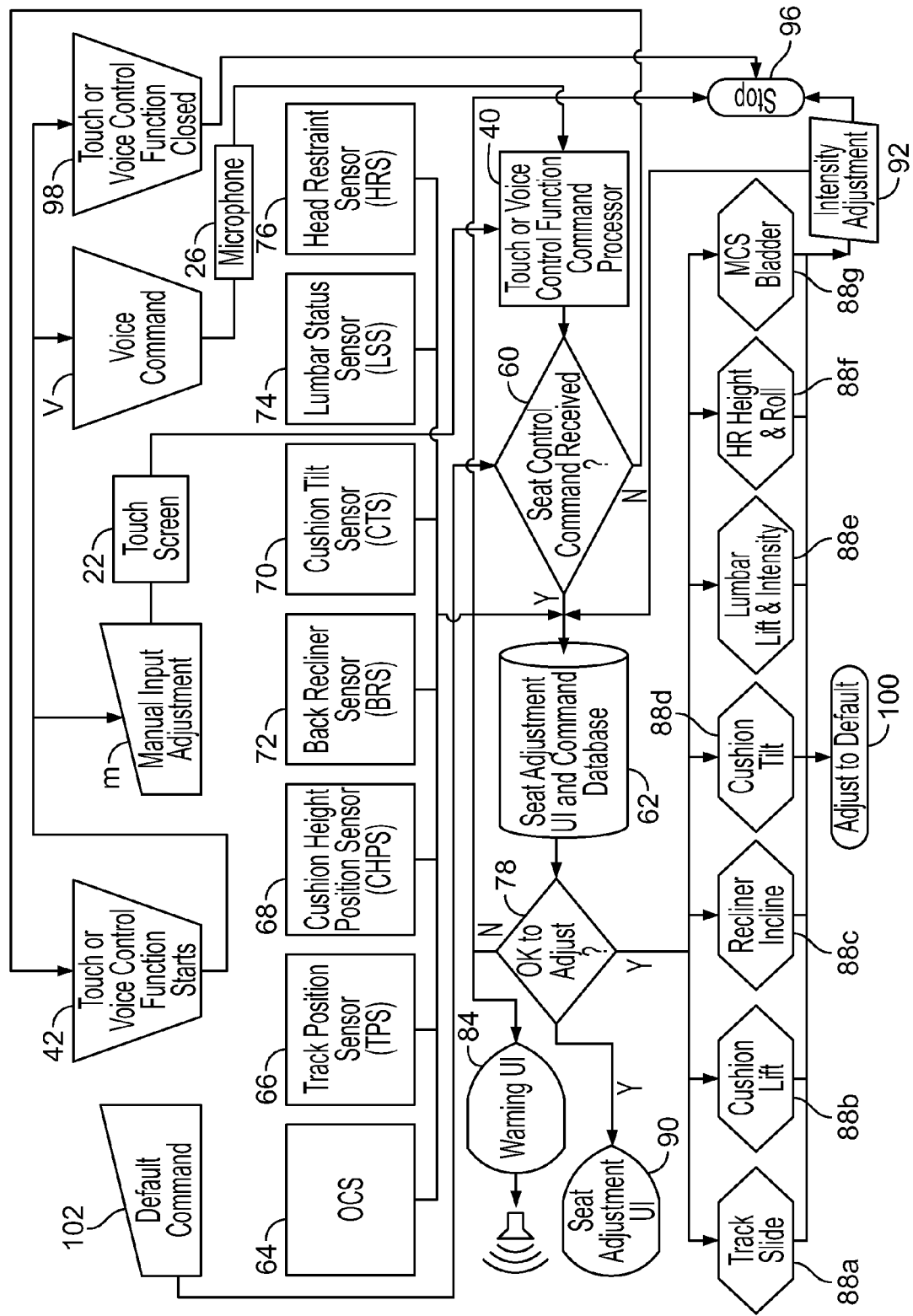
FIG. 4 is a schematic diagram of the control system of FIG. 1, showing various components thereof and various process steps that can be carried out by the control system in response to user inputs.

As shown in FIGS. 4-7, system 10 can be operational so as to permit a user U to make desired seat adjustments to the various moveable portions of a seat, such as seat 14, within vehicle 12 by voice commands V, manual commands M, or a combination thereof. A diagram of an embodiment of system 10 is shown in FIG. 4 and depicts the various inputs, operations, decisions, and components that can be controlled by an example of system 10 implemented in a vehicle 12 with a seat 14, that can be seat 14 as described above with respect to FIGS. 1-3 or a variation thereof. As described above with respect to FIG. 1, system 10 includes a voice input device, which can for example be a microphone 20 or other device capable of converting audio into an electronic signal. System 10 further includes a touchscreen input 22 that is a video display capable of receiving inputs in the form of touch inputs on an area of the touchscreen 22 on which a video image is displayed to allow for user interaction with an image displayed thereby.

The touchscreen 22 referred to as being within system 10 can be a touchscreen dedicated for adjustment of seat 14 and/or other seats within vehicle 12 or can be shared with other systems of vehicle 10, including a multimedia system, vehicle control system, or combinations thereof. Similarly, voice input device 20 can be a dedicated device for system 10 or can be shared with other vehicle systems, such as those previously listed and the like. In another embodiment, system 10 can be included with or otherwise a wholly or partially incorporated with a computer-based vehicle control system that implements touch and/or voice-based control of other vehicle systems or functions, including but not limited to music or multimedia, navigation, HVAC, and the like. An example of one such commercially-available system is SYNC™ available from Ford Motor Company™ of Dearborn, Mich.

System 10 can receive voice-based adjustment commands V from user U by monitoring the space within vehicle 12 for specific commands, which can be done continuously or for a predetermined period of time after a designated button or switch (not shown) that can be mounted on the steering wheel of vehicle such that user U can cause system 10 to actively "listen" for a voice command V. Whether active continuously or upon physical initiation by user U system 10, when active, will monitor an audio signal received from microphone 20 using a control function command processor 40, which may be a dedicated processor or specific functionality within a general processor for system 10. Function command processor 40 is capable of analyzing an audio signal to recognize language, including words and phrases, therein and to interpret commands and/or other recognized words to direct system 10 to carry out the requested command. Similarly, function command processor 40 can also include the capability to receive and interpret touch-based manual commands M from touchscreen 22, in general, by comparing detected touch interactions by user U on touchscreen 22 with available commands presented on the display touchscreen 22 and their designated respective locations on the display of touchscreen 22.

In an embodiment, System 10 can be programmed or otherwise configured to make adjustments to seat 14 only when system 10 is in a seat adjustment mode. As discussed above, both microphone 20 and touchscreen 22 can be shared with other systems of vehicle 12 for user control thereof. In such examples, the seat adjustment mode can prepare system 10 to receive voice commands V and/or manual commands M for specific seat adjustments. User U can direct system 10 to enter the seat adjustment mode by speaking a predetermined command to system 10, when in the above-described active state. Such a command can be, for example, "seat adjust," "adjust seat," "move seat," or the like. In another example, user U can say "adjust driver's seat," or "adjust passenger seat," which can cause system 10 to enter a seat adjustment mode for the specific seat for which adjustment is desired. Other commands are possible and may additionally include a specific addressing of system 10, such as by the system name (e.g. "SYNC, adjust seat") or the vehicle (e.g., "Ford, adjust driver's seat"). Such voice-implemented entering of the adjustment mode can be processed by system 10 in the background, without providing any notification or response to such activation. Alternatively, system 10 can provide audio or visual feedback that system 10 is in the adjustment mode, including the below-described reconfiguration of the display on touchscreen 22. Vehicle 12 can also include a process flow for user U to cause system 10 to enter the seat adjustment mode using touchscreen 22 (and/or additional physical input devices associated therewith) by appropriately navigating menu options related to system 10, including an option for entering seat adjustment mode, along with options related to other vehicle control options such as HVAC, navigation, etc.

With reference to the system diagram of FIG. 4, when system 10 is active and microphone 20 and touchscreen 22 are available for use by system 10 (such as through initiation of an adjustment mode, as described above), user U can adjust seat 14 through system 10 by either manual commands M entered using touchscreen 22 or voice commands V entered by speech directed to microphone 20. Specifically, when touch or voice control of seat 14 by system 10 starts in step 42 of FIG. 4, user U can input a manual adjustment M using touchscreen 22 or can speak a voice command V, which is received by microphone 20, the inputs then being respectively transmitted to function command processor 40 by electronic coupling thereto. As mentioned previously, function command processor 40 then interprets the command. Such interpretation can include a determination of the portion of seat 14 for which adjustment is desired and a direction for such adjustment (step 44). Examples of voice commands that can be interpreted according to such a scheme include "move seatback forward", which can be interpreted as a command to move seatback 16 in a manner such that the incline angle 28 is brought closer to a vertical position, or such that it rotates toward the front of vehicle 12, "increase lumbar support," which can be interpreted as a command to extend lumbar area 36 outward with respect to seatback 16, or "move lumbar support up," which can be interpreted as a command to move an outwardly-extended portion of lumbar area 36 upward (i.e. toward headrest 38. A number of other commands are possible according to various other modes of seat adjustment, including but not limited to the adjustments of seat 14 described above with respect to FIGS. 1-3.

Figure 5:
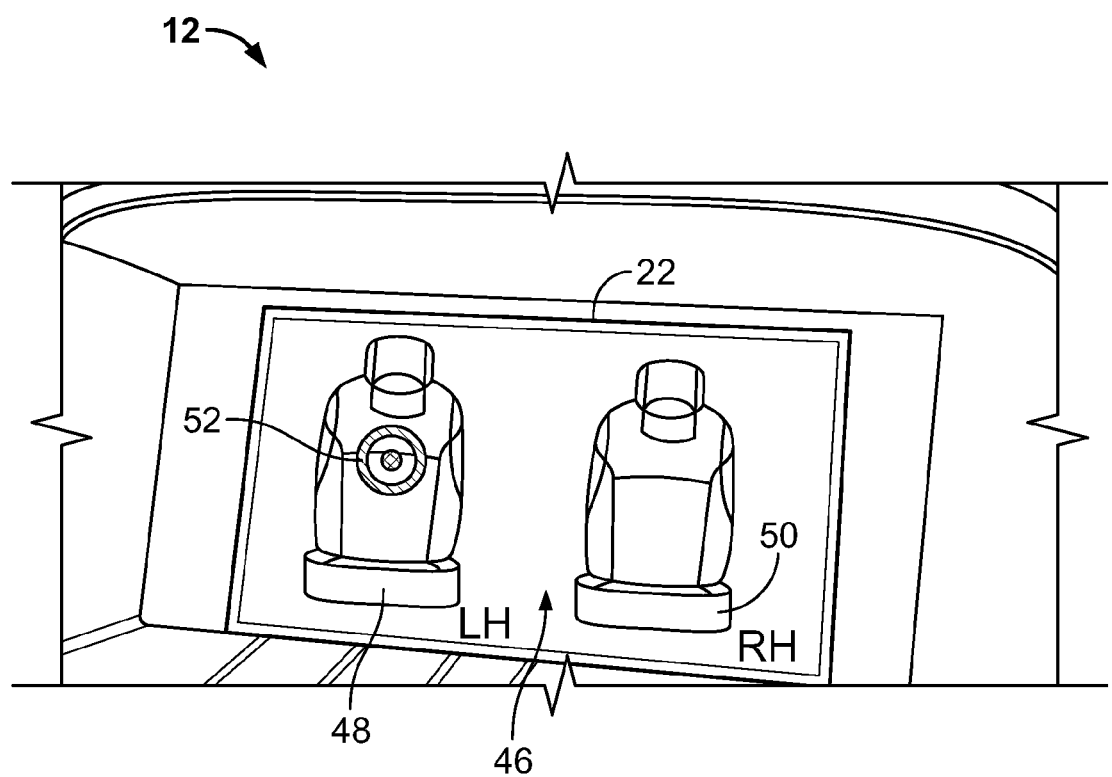
FIG. 5 is an illustration of a touch-based control and visualization image that can be generated by the control system of FIG. 1.
Figure 6:
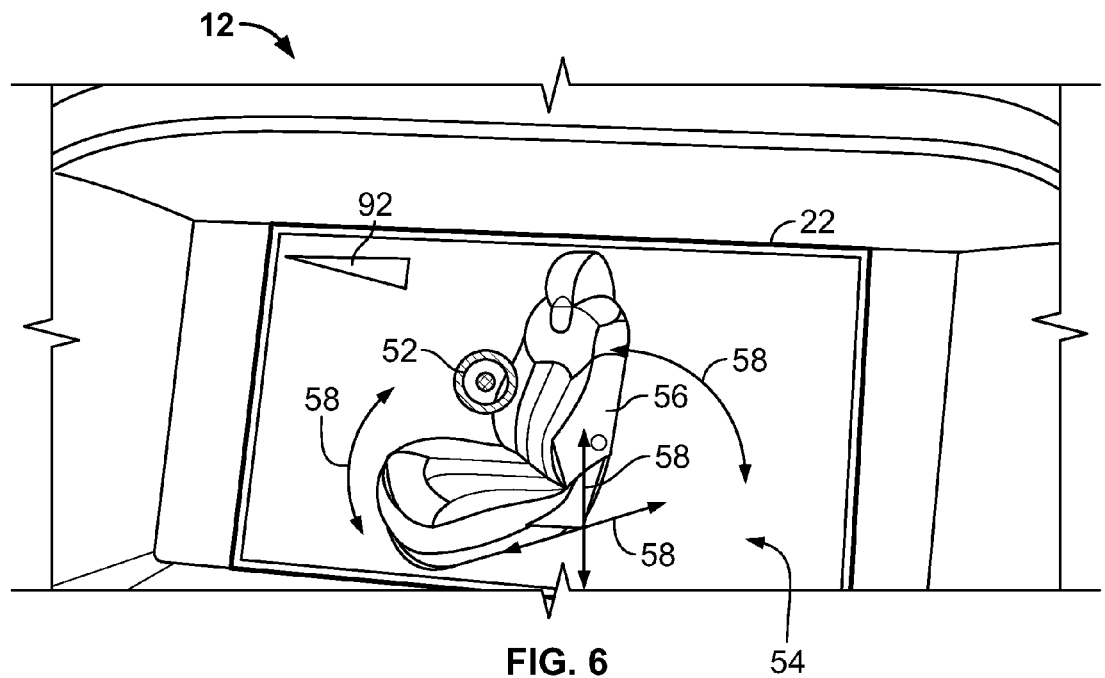
FIG. 6 is an illustration of another touch-based control and visualization image that can be generated by the control system of FIG. 1.

As shown in FIGS. 5 and 6, system 10 can specifically configure touchscreen 22 to receive a manual command M from user U by interaction therewith. As described above, touchscreen 22 can function, in general, by presenting an image thereon that can include designated areas for interaction therewith in the form of touch inputs from user U. Such areas can be in the form of simulated buttons or the like and can include text indicating the function of the simulated button. In the embodiment illustrated in FIGS. 5 and 6, touchscreen 22 can present various interactive images of one or more seats, depending on the particular stage of the seat adjustment process. As shown in FIG. 5, a seat selection image 46 can be presented upon implementation of a seat adjustment mode, as described above, or as a default on a variation of touchscreen 22 designated for seat adjustment functionality. The seat selection image 46 can include a left-hand (or driver's) side seat 48 and a right-hand (or passenger) side seat 50 to allow user U to select a seat for adjustment by a touch interaction, as illustrated by indicator 52, which may not actually be depicted on touchscreen 22, but is shown in the Figures to indicate a possible location for a touch carried out by user U on touchscreen 22. In an example, the seat selection image 48 can be presented upon selecting a seat adjustment mode from a menu on a shared touchscreen 22 and/or can be presented upon user U giving an adjustment initiation command without specifying a seat (e.g. "adjust seat"), which can serve as an indication for user U to select a specific seat to be adjusted by either a voice command V indicating the seat or by a touch interaction with the appropriate seat image 50 or 52. Seat selection image 48 can include further seats therein, depending on the particular seats within vehicle 12 that can be adjusted by system 10.

Upon selection of a particular seat to be adjusted, by any of the above-described procedures, for example, a seat adjustment image 54 can be presented on touchscreen 22. Seat adjustment image can include an interactive seat representation 56 with portions thereof corresponding to seat 14, as described above, for example. By interacting with such image on touchscreen 22, user U can enter a manual command M for adjustment of seat 14 by first touching on the portion of interactive seat representation 56 that corresponds to the portion of seat 14 for which adjustment is desired. In an example, user U can touch screen on the portion of interactive seat representation 56 that corresponds to seatback 16 of seat 14, as shown by touch indicator 52 in FIG. 6. The portion of seat 14 selected can be indicated to user by, for example, changing the color of that portion of interactive seat representation 56. Subsequently, user U can direct system 10 to adjust the corresponding portion of seat 14 by continuously touching the appropriate portion of interactive seat representation 56 and by dragging in the direction of the desired adjustment (e.g., in the direction corresponding to forward rotation of seatback 16, as discussed above). Alternatively, system 10 can present guides 58 that show the available adjustment movements for the selected portion of seat 14, with which user U can interact via touching, dragging, or the like to achieve the desired movement thereof.

Additionally, system 10 can present the interactive seat representation 56, along with the associated indications of selected seat portions for adjustment and the available movements using guides 58, therefor during adjustment of seat 14 by voice command V. Such action by system 10 can provide user U with visual feedback and confirmation that system 10 is correctly interpreting voice commands and can provide verification that system 10 is adjusting seat, which may be particularly useful when subtle seat adjustments are being made. Further, the presentation of interactive seat representation 56 and, optionally, guides 58 can allow for system 10 to accept a mix of voice commands V and manual commands M in a single instance of seat 14 adjustment. For example, user U can give voice command to "tilt driver's seat cushion forward," which can be interpreted by function command processor 40 as a command to rotate cushion 32 of seat 14 in a direction corresponding to the counterclockwise direction of cushion 32 in FIG. 3. If user U then determines, that the adjustment of cushion 32 as such is too far, user U can use an associated guide image 58 to rotate cushion 32 in the opposite direction, as desired. In another example, user U can, via manual commands M, adjust seatback 16, and then move seat 14 forward in direction 30 by voice command V. In a still further example, user U can begin adjustment by a voice command V such as "adjust driver's seatback," which can be interpreted as a command to change the incline angle 28 of seatback 16, but without a particular direction indicated. At such a point, system 10 can display interactive seat representation 56 along with appropriate guides 58 with which user U can interact with manual commands M to input the desired direction of movement for seatback 16. Countless other combinations of voice commands V and manual commands M are possible within such a framework.

System 10 can also include functionality to determine whether an adjustment for seat 14, as interpreted by function command processor 40 is possible or safe to implement, given the status of various observed factors. As shown in FIG. 4, system 10 can determine in step 60 that a command (either by touch or voice) is a seat control command, such as those described above with reference to FIGS. 4 and 5. Upon such a determination and prior to making any associated adjustments, such as those in the corresponding examples above, system 10 can compare information received from various sensors within vehicle 12 with information in database 62 to determine if the command received is possible and/or safe. Such sensors can include an occupant cushion sensor ("OCS") 64, which can determine the weight of the occupant of seat 14, and a track position sensor ("TPS") 66, which can determine the particular fore-aft positioning of seat 14 in direction 30 (shown in FIG. 3). Additional sensors can be included in seat 14 and can be associated with the various adjustable portions thereof. In the example of seat 14 discussed with respect to FIGS. 1-3, for example, such sensors can include a cushion height positions sensor ("CHPS") 68 and a cushion tilt sensor ("CTS") 70 coupled with cushion 32, a back recline sensor ("BRS") 72 coupled with seatback 16, a lumbar status sensor ("LSS") 74 coupled with lumbar area 36, and a head restraint sensor ("HRS") 76 coupled with headrest 38. Each of these sensors can determine the instantaneous position of the associated portions of seat 14, which can be inputted to a processor within system 10 that can compare such positions with the received adjustment command and with various data within database 62. These sensors 68, 70, 72, 74, and 76 can also be used by system 10 in preparing seat representation 56 image for display on touchscreen 22 by taking input from the sensors regarding the current positions of the associated moveable portions of seat 14 and using them to configure seat representation 56 so as to at least approximately reflect the actual configuration of seat 14, prior to and/or during adjustment.

In an example, database 62 can include information related to the ranges of motion for the adjustment of the various portions of seat 14, as determined by the construction of seat 14. Such information can be compared with the instantaneous position of a portion of seat 14 associated with an adjustment command determined in step 60 and the desired direction thereof. If such a comparison indicates that movement is desired of a portion of seat 14 that is at a limit of its range of motion, with movement desired in the direction of that limit, system 10 can determine in step 78 that adjustment cannot be implemented. In another example, the information within database 62 can relate to particular ranges of motion for certain portions of seat 14 that are dependent on the size of the occupant of seat 14 (which may or may not be the user of system 10 at a particular moment).

For example, it may be desired to limit the forward sliding of seat 14 and/or the incline 28 of seatback 16 for larger occupants. Accordingly, when OCS 64 indicates a large occupant (e.g. in the 95$^{th}$ percentile of occupants), fore-aft movement of seat 14 in direction 30 and/or the incline 28 of seatback 16, for example, can be limited to a greater extent than the physical ranges of motion thereof to prevent the occupant from being positioned too close to the steering wheel 80 (FIG. 3). Other similar limits can be implemented for consideration in step 78 that can relate to other positioning considerations given various occupant sizes, which may be similar to the considerations made by other vehicle safety systems such as airbag deployment control systems or seatbelt pretensioners, for example. In another example, the incline 28 of seatback 16 in a rearward direction can be limited if a passenger P is detected in a rear seat 81 of vehicle 12 by an additional sensor.

Figure 7:
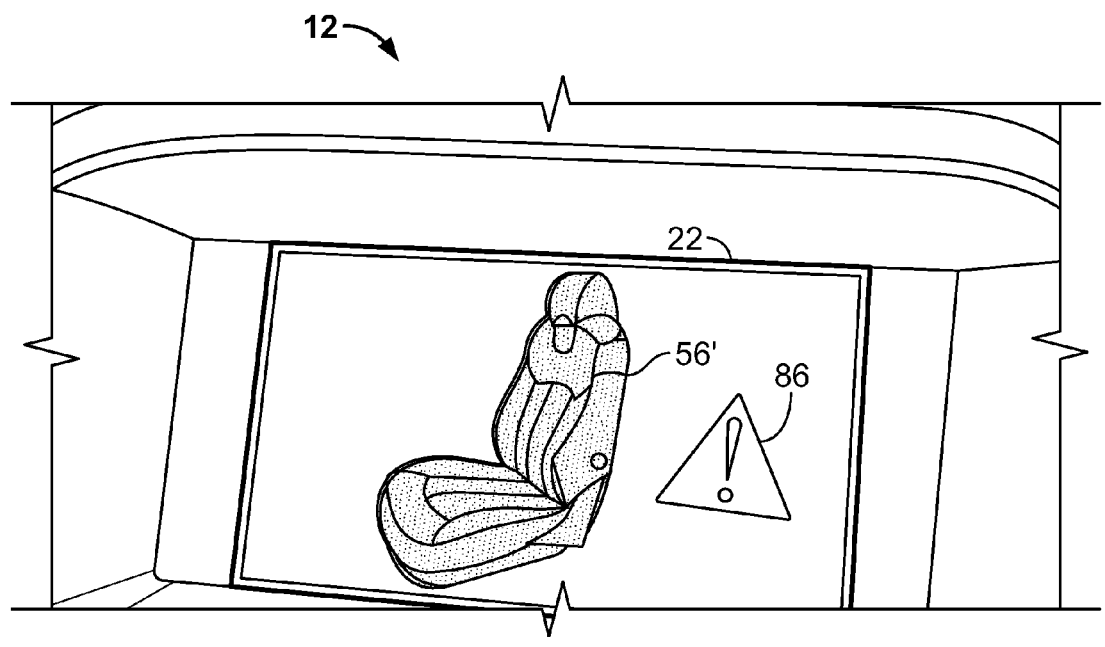
FIG. 7 is an illustration of a visual warning image that can be generated by the control system of FIG. 1.

If system 10 determines in step 78 that seat adjustment is not safe or possible, according to factors such as those described in the above examples, an adjustment warning image 82 can be presented on touchscreen 22 in step 84 and as shown in FIG. 7. Such an image can include changing the color of interactive seat representation 56, such as to red or the like along with a warning symbol 86, of which an example is illustrated in FIG. 7. The warning image 82 can be displayed for a brief period of time (e.g. about 1 second) and can be accompanied by an audible tone before system reverts to displaying adjustment image 54, such as shown in FIG. 6 or the like.

If system 10 determines in step 78 that the interpreted adjustment is safe and possible, system 10 can adjust seat 14 using controller 24, for example. Such adjustment is shown in the diagram of FIG. 4 in step 88 and can include the adjustments described in the examples above, or other adjustments permitted by seat 14, including fore-aft sliding of seat 14 in substep 88a, raising or lowering cushion 32 (and or seat 14) in substep 88b, increasing or decreasing the incline 28 of seatback 16 in substep 88c, tilting of cushion 32 in substep 88d, lumbar area 36 adjustment (position and/or extension) in substep 88e, headrest 38 adjustment (such as height and angular positioning) in substep 88f, or coordinated movement of various components for implementation of massage functionality in substep 88g (which can also be implemented by designated structure).

An adjustment user interface can be implemented in step 88 during any of the seat adjustments in step 90. This can include, for example, animating interactive seat representation 56 and/or guides 58 or changing the color thereof, such as to green for example. Additionally, an intensity control image 92 can be presented on touchscreen 22 that can allow user U to control the speed with which the implemented adjustment of seat 14 is carried out by system 10 via controller 24 in step. When seat 14 is being adjusted according to an interpreted command, the speed and or other intensity can be controlled by additional voice control V (e.g., "faster" or "slower") in step 94.

The above-described seat adjustment in step 88 can continue according to a default speed or a selected speed in step 94 until a stop command is given in step 96. The stop command can be given by a voice command V such as "stop" or can be given by a manual command M, which can be, for example, the release or end of a dragging motion, tapping on a simulated stop button on touchscreen 22 or release of a held touch on a directional movement indicator associated with guide 58 or the like. As with other modes of interaction, a stop command can be given by a voice command V after adjustment is initiated by a manual command M or vice versa. After stopping one adjustment, system 10 can loop and wait a predetermined period of time for an additional command in step 60. At the end of such a predetermined time (e.g. between about 3 seconds to about 7 seconds) system 10 can deactivate seat adjustment in step 98, which can allow microphone 20 and/or touchscreen 22 to be used by other systems within vehicle 10 and can further require initiation of the adjustment mode in step 42 to begin another adjustment.

An embodiment of system 10 can include functionality to adjust seat to a default position in step 100. Information relating to the default position can be stored in system 10 and can be set by user U. System 10 can also include information related to predetermined default positions for particular seats, including a "chauffeur" position for the front passenger-side seat wherein seat 14 is in a forward-most position along direction 30 and seatback 16 is inclined forward and further including a fold-flat position for a middle or rear bench seat, wherein the respective seatback (not shown) is inclined completely forward or backward (depending on the particular construction of the seat). Such predetermined default positions can be among a plurality of default positions for any given seat from which user U can select. Adjustment to the default position can be initiated by a direct command 102 by use of a designated physical button such as button 104, shown in FIG. 2. Adjustment of seat 14 to the default position can be initiated using button 102 regardless of whether system 10 is in the active state, described above, for example. Further, adjustment to one or more default positions can be implemented when system 10 is in the active state by a voice command V (e.g. "adjust driver's seat to default") or by a manual command M input using touchscreen 22 on a simulated default button or the like. Such adjustment to default can be implemented in step 88 by making any adjustments of the moveable portions of seat 14 (substeps 88a-88g, for example) determined to be necessary by system 10. Such adjustments can be carried out simultaneously or in sequence.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A control system for a vehicle having a seat with first and second moveable portions and first and second adjustment actuators respectively coupled with the first and second moveable seat portions, the system comprising:
    a voice input device;
    a touchscreen input device;
    a first position sensor coupled with the first moveable portion;
    a second position sensor coupled with the second moveable portion; and
    a controller in communication with the first and second adjustment actuators, the voice input device, and the touchscreen input device, the controller including a processor programmed to:
        interpret a first adjustment command from one of a voice command received from the voice input device and a manual command received from the touchscreen input device;
        carry out a first seat adjustment by causing the adjustment actuator to move the first moveable seat portion according to the first adjustment command;
        determine a position of the first moveable portion based on communication from the first position sensor and to override the first seat adjustment based on a finding that the determined position of the first moveable portion has reached at least one predetermined movement limit, the at least one predetermined movement limit being one of an end of a predetermined range of motion for the first moveable portion or an end of a safe range of positions for the first moveable portion determined from input received from the first position sensor and the second position sensor; and
        present information related to the first adjustment command on the touchscreen.

2. The control system of claim 1, wherein the information related to the first adjustment command includes an image of a vehicle seat, including a representation of the first moveable portion, and at least one adjustment indicator image associated with the representation of the first moveable portion.

3. The control system of claim 2, wherein the controller is configured to interpret the first adjustment command from the manual command based on a detected interaction with the image of the vehicle seat presented on the touchscreen input device.

4. The control system of claim 1, wherein: the controller is in communication with the position sensor; and
    the processor is further programmed to:
        process information for a default seat configuration;
        interpret the first adjustment command as a default position command; and
        upon interpreting the default position command, carry out the first seat adjustment further based on comparison of the determined position of the first moveable seat portion and the information for the default seat configuration.

5. The control system of claim 1, wherein the processor is further programmed to:
    interpret a stop command from the at least one of the voice command and the manual command; and
    upon interpretation of the stop command, cause the adjustment actuator to stop moving the first moveable seat portion.

6. The control system of claim 1, wherein the processor is further programmed to:
    enter a seat adjustment mode and cause an interactive seat image to be displayed on the touchscreen input device after interpreting an adjustment initiation command from one of the voice command and the manual command;
    carry out the first seat adjustment only when in the seat adjustment mode; and
    terminate the seat adjustment mode and remove the interactive seat image after a predetermined non-action period.

7. The control system of claim 6, wherein the processor is further programmed to enter the seat adjustment mode and carry out the first seat adjustment based on the adjustment initiation command and the first adjustment command being interpreted from different ones of the voice command and the manual command.

8. The control system of claim 7, wherein:
    the processor is further programmed to carry out a second seat adjustment based on interpretation of a second adjustment command from either the voice command or the manual command only when in the seat adjustment mode; and
    wherein interpretation of either of the first and second adjustment commands precludes the non-action period.

9. The control system of claim 1, wherein the processor is configured to:
    interpret a second adjustment command; and
    carry out a second seat adjustment by causing the adjustment actuator to at least one of: reverse movement of the first portion of the seat; stop moving the first portion of the seat; and move a second portion of the seat, based on interpretation of a second adjustment command from one of the voice command or the manual command.

10. The control system of claim 9, wherein the processor is configured to carry out the first and second seat adjustments based on interpretation of the first and second adjustment commands from different ones of the voice command and the manual command.

11. A control system for an adjustable vehicle seat, comprising:
   a microphone;
   a touchscreen;
   a first position sensor coupled with a first seat portion;
   a second position sensor coupled with a second seat portion; and
   a controller in communication with the seat, the microphone, the touchscreen, the first seat portion, and the second seat portion and programmed to:
      begin a first adjustment of the seat upon interpreting a first adjustment command based on input received from one of the microphone and the touchscreen and to stop the first adjustment upon interpreting a stop command received from the other of the microphone and the touchscreen; and
      determine a position of the first seat portion based on communication from the first position sensor and to override the first seat adjustment based on a finding that the determined position of the first seat portion has reached at least one predetermined movement limit, the at least one predetermined movement limit being one of an end of a predetermined range of motion for the first seat portion or an end of a safe range of positions for the first seat portion determined from input received from the first position sensor and the second position sensor.

12. The control system of claim 11, wherein the controller is programmed to begin the first adjustment of the seat upon interpreting the first adjustment command based on input received from one of the microphone and the touchscreen and to stop the first adjustment upon interpreting the stop command from the other of the microphone and the touchscreen.

13. The control system of claim 11, wherein the processor is further programmed to:
   enter a seat adjustment mode after interpreting an adjustment initiation command received from one of the voice input device and the touchscreen; and
   cause the actuator to move the first portion of the seat only when in the adjustment mode; and
   terminate the seat adjustment mode after a predetermined non-action period.

14. A method for adjusting a vehicle seat, comprising:
   receiving an adjustment initiation command from one of a voice input device and a physical input device;
   entering a seat adjustment mode in response to the adjustment initiation command;
   receiving an adjustment command from the other of the voice input device and the physical input device;
   when in the seat adjustment mode, causing an actuator to move a first moveable seat portion according to the adjustment command; and
   while causing the actuator to move the first moveable seat portion, determining a position of the first moveable seat portion based on communication from a first position sensor coupled with the first moveable seat portion and stopping moving the first moveable seat portion based on a finding that the determined position of the first moveable seat portion has reached at least one predetermined movement limit, the at least one predetermined movement limit being one of an end of a predetermined range of motion for the first moveable seat portion or an end of a safe range of positions for the first seat portion determined from input received from the first position sensor and a second position sensor coupled with a second moveable seat portion.

15. The method of claim 14, further including:
while causing the actuator to move the first moveable seat portion according to the adjustment command, receiving a stop command from the other of the voice input device or the physical input device; and
causing the actuator to stop movement of the first moveable seat portion in response to the stop command.

16. The method of claim 14, further comprising:
receiving position information from the first position sensor; and
prior to causing the actuator to move the first moveable seat portion according to the adjustment command, determining that movement of the first seat portion according to the adjustment command is a permitted seat adjustment.

17. The method of claim 14, further comprising:
interpreting the adjustment command to include instructions to return to a default seat configuration;
retrieving information on the default seat configuration, including a default position of the first moveable seat portion, from a memory device;
receiving information on an instantaneous position of the first moveable seat portion from the first position sensor; and
determining that the instantaneous position of the first seat portion and the default position of the first seat portion are different;
wherein, when the adjustment command includes instructions to return to a default seat configuration and when the instantaneous position and the default position are different, causing the actuator to move the first moveable seat portion according to the adjustment command includes moving the first seat portion toward the default position.

18. The method of claim 14:
wherein the physical input device is a touchscreen display; and
the method further comprises:
   upon entering the seat adjustment mode, causing an image of a vehicle seat, including a representation of the first moveable portion, to be presented on the touchscreen display; and
   upon receiving an adjustment command from one of the voice input device and the physical input device when in the seat adjustment mode, causing at least one adjustment indicator image to be presented on the touchscreen display along with the representation of the first moveable portion.

* * * * *